United States Patent
Thornburg et al.

(10) Patent No.: US 10,921,829 B1
(45) Date of Patent: Feb. 16, 2021

(54) ALIGNED-OUTLET AND DISTAL-FLUSHABLE BLOW CASE

(71) Applicants: Jeremie Thornburg, Spiro, OK (US); Jerry Michael Bray, Spiro, OK (US)

(72) Inventors: Jeremie Thornburg, Spiro, OK (US); Jerry Michael Bray, Spiro, OK (US)

(*) Notice: Subject to any disclaimer, the term of this patent is extended or adjusted under 35 U.S.C. 154(b) by 155 days.

(21) Appl. No.: 16/025,326

(22) Filed: Jul. 2, 2018

Related U.S. Application Data

(63) Continuation-in-part of application No. 14/526,735, filed on Oct. 29, 2014, now Pat. No. 10,036,406.

(51) Int. Cl.
| | | |
|---|---|---|
| G05D 9/00 | (2006.01) | |
| B01D 21/30 | (2006.01) | |
| B01D 21/24 | (2006.01) | |
| E21B 43/34 | (2006.01) | |

(52) U.S. Cl.
CPC .............. *G05D 9/00* (2013.01); *B01D 21/245* (2013.01); *B01D 21/307* (2013.01); *E21B 43/34* (2013.01)

(58) Field of Classification Search
CPC .. B01D 21/307; B01D 21/0087; B01D 21/02; B01D 21/24; B01D 21/2405; B01D 21/2427; B01D 21/245; B01D 21/2472; E21B 43/34; Y10T 137/7319; Y10T 137/7358; Y10T 137/7368; Y10T 137/7371; Y10T 137/7384; Y10T 137/7423; F16K 31/18; F16K 31/34; F16K 15/181; F16K 33/00
See application file for complete search history.

(56) References Cited

U.S. PATENT DOCUMENTS

| | | | | |
|---|---|---|---|---|
| 35,606 | A * | 6/1862 | Hatfield | F16K 15/03 137/527.8 |
| 1,025,079 | A * | 4/1912 | Wells | F02M 37/02 417/133 |
| 1,039,749 | A | 10/1912 | Ingram | |
| 1,561,159 | A * | 11/1925 | Hurst | F02M 37/02 417/133 |
| 2,048,088 | A | 7/1936 | Wagner | 251/126 |
| 2,630,783 | A | 3/1953 | Reeve | 119/14.07 |
| 2,818,819 | A * | 1/1958 | Heard | F16T 1/24 417/128 |
| 4,223,697 | A | 9/1980 | Pendleton | 137/527.8 |
| 4,243,528 | A * | 1/1981 | Hubbard | B01D 17/0208 210/104 |
| 4,800,917 | A | 1/1989 | DePirro | 137/315 |
| 5,221,523 | A | 6/1993 | Miles et al. | 422/182 |
| 5,800,700 | A | 9/1998 | Liu | 210/109 |

(Continued)

*Primary Examiner* — Hailey K. Do
(74) *Attorney, Agent, or Firm* — Keisling & Pieper PLC; David B. Pieper; Trent C. Keisling

(57) ABSTRACT

A blow case with an inlet pipe positioned to gravity direct debris to an outlet pipe. The inlet pipe having a discharge end sealed by gravity open clapper style check valve that is closed by activation of pneumatic pressure through a float style pneumatic valve. The check valve has a top mounted access port and aperture allowing for direct above ground servicing access to both the clapper inside the valve and has a removable clapper and access port for servicing the outlet pipe. The float style pneumatic valve is also top mounted for ease of service and removal and is remotely positioned from the outlet pipe to allow for removal of the valve for flushing of the debris from the blow case.

1 Claim, 3 Drawing Sheets

(56) References Cited

U.S. PATENT DOCUMENTS

| | | | |
|---|---|---|---|
| 6,000,425 A | 12/1999 | Steinorth | 137/391 |
| 6,010,674 A | 1/2000 | Miles et al. | 423/245.3 |
| 6,062,253 A | 5/2000 | Hanel et al. | 137/360 |
| 6,247,492 B1 | 6/2001 | Stuart | 137/413 |
| 6,644,400 B2 | 11/2003 | Irwin et al. | 166/75.12 |
| 6,907,933 B2 | 6/2005 | Choi et al. | 166/357 |
| 7,275,599 B2 | 10/2007 | Wilde | 166/372 |
| 7,299,879 B2 | 11/2007 | Irwin, Jr. | 166/372 |
| 7,389,814 B2 | 6/2008 | Irwin, Jr. | 166/53 |
| 7,610,955 B2 | 11/2009 | Irwin, Jr. | 166/53 |
| 7,757,706 B2 | 7/2010 | Coscarella | 137/315.41 |
| 8,057,192 B2 * | 11/2011 | Page, Jr. | F04F 1/06 137/413 |
| 8,596,289 B2 | 12/2013 | Krug | 137/15.26 |
| 10,036,406 B1 | 7/2018 | Thornburg et al. | 166/54 |
| 2014/0027386 A1 * | 1/2014 | Munisteri | B01D 21/10 210/744 |
| 2015/0292192 A1 * | 10/2015 | Linteau | E03F 5/14 241/21 |

\* cited by examiner

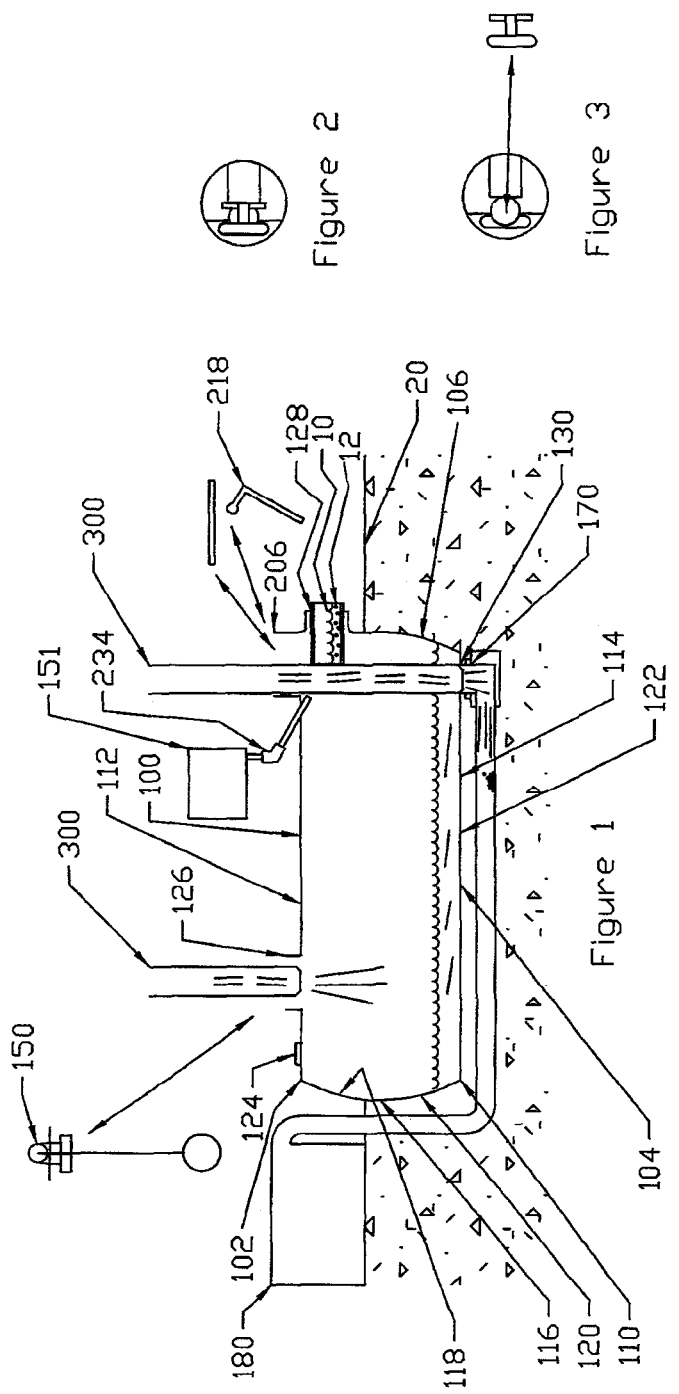

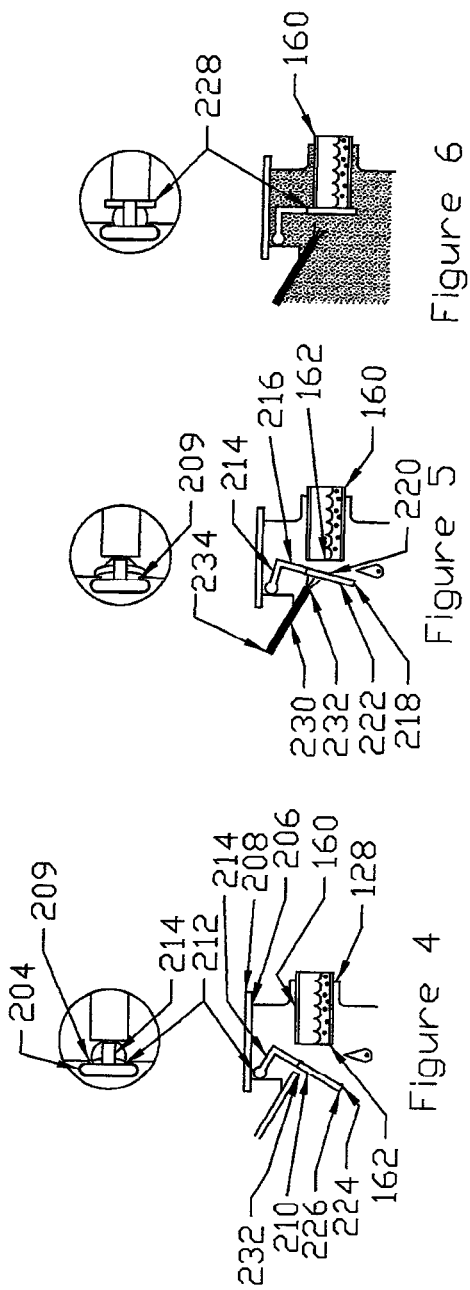

ALIGNED-OUTLET AND DISTAL-FLUSHABLE BLOW CASE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in blow cases used for waste streams with well systems such as oil or natural gas wells. More particularly, the invention relates to improvements particularly suited for providing debris flow, removal and maintenance for blow cases.

2. Description of the Known Art

As will be appreciated by those skilled in the art, blow cases are known in various forms. Patents disclosing information relevant to blow cases include: U.S. Pat. No. 7,610,955, issued to Irwin, Jr. on Nov. 3, 2009 entitled Controlled gas-lift heat exchange compressor; U.S. Pat. No. 7,389,814, issued to Irwin, Jr. on Jun. 24, 2008 entitled Heat exchange compressor; U.S. Pat. No. 7,299,879, issued to Irwin, Jr. on Nov. 27, 2007 entitled Thermodynamic pulse lift oil and gas recovery system; U.S. Pat. No. 7,275,599, issued to Wilde on Oct. 2, 2007 entitled Positive pressure gas jacket for a natural gas pipeline; U.S. Pat. No. 6,907,933, issued to Choi, et al. on Jun. 21, 2005 entitled Sub-sea blow case compressor; U.S. Pat. No. 6,644,400, issued to Irwin, Jr. on Nov. 11, 2003 entitled Backwash oil and gas production; U.S. Pat. No. 6,010,674, issued to Miles, et al. on Jan. 4, 2000 entitled Method for controlling contaminants during natural gas dehydration; and U.S. Pat. No. 5,221,523, issued to Miles, et al. on Jun. 22, 1993 entitled Contaminant control system for natural gas dehydration. Each of these patents is hereby expressly incorporated by reference in their entirety.

In a typical prior art application, the prior art blow case is buried halfway into ground with an inline check valve controlled input pipe flowing into the tank, an exit constructed from a vertical stand pipe extending close to the bottom of the case and exiting out of the top of the blow case, and the air pressure control valves located either inside the blow case or externally below ground level. The prior art construction provides a multitude of failure points. Trash flow through the input lines gets caught in the line prior art check valve that is located in the pipe one to two feet before the blow case which causes failures because the air pressure systems cannot operate a trash ridden check valve. This prevents blowcase operation which eventually affects well production. Furthermore, any trash or debris that does make it past the check valve and enters the tank fall to the bottom of the tank does not flow out of the vertical stand pipe. The trash and debris accumulates inside the tank which reduces capacity, causes over cycling of the system, and eventually builds up enough to cause a plug failure of the system. Still further, the prior art air valve is located blow ground either externally below the tank, or inside the tank below ground level, and this valve fails due to the trash, debris, environment, and normal wear. Replacing the prior art air valve is extremely time consuming. Each of these various failure modes requires constant maintenance to avoid the issues which creates additional expense in the operation of the blowcase. Furthermore, the maintenance is expensive because of the location of the failure points and the limited access to these trouble areas.

From these prior references it may be seen that these prior art patents are very limited in their teaching and utilization, and an improved blow case is needed to overcome these limitations.

SUMMARY OF THE INVENTION

The present invention is directed to an improved blow case using top mounted pneumatic valve, clapper valve, and access port positioning to flush and clear the blow case and the outlet pipe with minimal down time. In accordance with one exemplary embodiment of the present invention, an improved blow case is provided using compressed gas to force a liquid flow through an outlet. The blow case uses a containment wall housing an interior storage compartment with an inlet aperture and an outlet aperture. The inlet aperture includes an inlet pipe terminating at a discharge end that is selectively sealed with a swing cap hinged to be gravity opened and gas pressure closed. The valve includes a valve body defining a cradle rotatably supporting a clapper assembly with a hinge pin that rotates in the cradle. The clap assembly includes a gravity extension arm connected to the hinge pin which uses gravity to naturally open the valve. The clapper also includes a drop arm connected to the gravity extension arm where the drop arm includes a front face sized to cover the discharge end of the pipe to seal off the pipe. A float valve including a valve body mounted outside the containment wall at the float aperture, the float valve including a float arm extending through the float aperture and a float body connected to the float arm. A float valve for controlling an gas pressure supply directed through a nozzle against the back face of the clapper is used to close the clapper against the discharge end of the inlet pipe and pressurize the blow case to force liquid and debris to flow through the outlet pipe. The float valve is mounted on top of the blow case body with an access aperture to allow an arm and a float body to extend into the blow case.

Advantages of the present invention include the use of an inlet with an internal extension terminating directly above the outlet drain to directly transfer debris from the inlet pipe to the outlet drain such that the debris does not collect in the body of the blow case.

A second advantage is the use of a gravity open valve such that no gas pressure has to be maintained during the majority of time the well is operated with liquid flowing into the blow case.

Another advantage is the use of a valve with a terminating end seal for the clapper which results in a gravity debris flow away from the sealing location for natural clearing of the valve.

A further advantage is that the clapper type check valve is located close to the top with an access port and cover for above ground servicing and clearing of the clapper. The clapper is removable and the valve body includes a flushing piper access aperture that is also directly positioned above the outlet with a clearance aperture sized to allow for a flushing pipe to be inserted for direct access to the outlet for flushing of the outlet pipe.

Yet a further advantage of the present invention is the pneumatic valve location on the opposite or distal end of the blow case, above ground level, and outside of the blow case for easy servicing of the pneumatic valve and such that the pneumatic valve can be disconnected to expose the pneumatic valve access aperture such that a flushing pipe can be inserted to flush out the blow case form the opposing end.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 1 is a cut away schematic view of a blow case showing the pneumatic float valve removed with a pneumatic valve flushing pipe inserted at the left end of the blow case, and the valve access cover and the clapper removed at the right end of the blow case with a clapper valve flushing pipe inserted to directly access the outlet pipe.

FIG. 2 is a top schematic view of the clapper check valve of FIG. 1 showing the clapper installed in a closed position.

FIG. 3 is a top schematic view of the clapper check valve of FIG. 1 showing the clapper removed and positioned to the right side.

FIG. 4 is a top and side cutaway schematic view of the clapper check valve of FIG. 1 showing the clapper in a gravity open position.

FIG. 5 is a top and side cutaway schematic view of the clapper check valve of FIG. 1 showing the clapper being partially moved by the entering gas pressure from the pressure nozzle.

FIG. 6 is a top and side cutaway schematic view of the clapper check valve of FIG. 1 showing the clapper being completely closed on the terminating end of the inlet pipe by the entering gas pressure from the pressure nozzle.

DETAILED DESCRIPTION OF THE INVENTION

Figure 7:
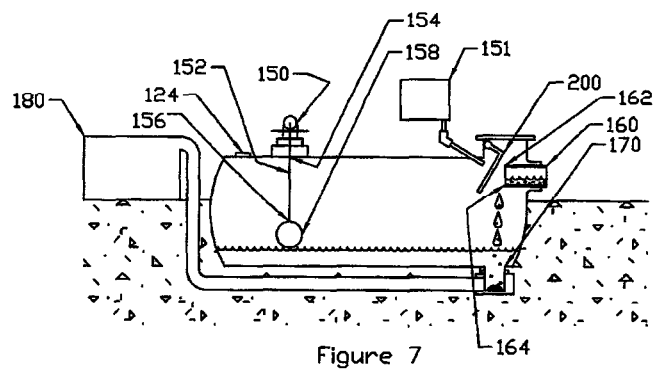
FIG. 7 is a cut away schematic view of a blow case showing the left end pneumatic float valve in a low float body position and the right end clapper check valve in a naturally open position with direct debris flow from the inlet to the outlet.

As shown in FIGS. 1 through 11 of the drawings, one exemplary embodiment of the present invention is generally shown as a blow case 100. That is used to control a liquid flow 10 including debris 12. The blow case 100 is partially mounted above and below ground level 20. The blow case 100 includes a first end 102, a middle section 104, and a second end 106.

The blow case 100 is made with a containment wall 110 defining a wall top 112, wall bottom 114, wall side 116, inside surface 118, and outside surface 120. The containment wall 110 defines an interior compartment 122.

The blow case 100 includes a pressure relief valve 124 for controllably releasing pressure from inside the blow case 100 either through an overpressure condition, through manual operation or can be automatically controlled by a control system. As valve and control systems are well known, these may be understood by reviewing the prior art.

The containment wall 110 also defines a float aperture 126, an top access port 206, an inlet aperture 128, and an outlet aperture 130. The float aperture 126 location on the opposite or distal end of the blow case 100 from the outlet aperture 130 allows a flushing pipe 300 to be inserted to flush out the blow case 100 from the opposing end. The inlet aperture 128 has an internal extension to the discharge end 162 terminating directly above the outlet pipe 170 directly transfers debris from the inlet pipe 160 to the outlet pipe 170 such that the debris 12 does not collect in the body of the blow case 100. Further importance of the top access port 206 and outlet aperture 130 locations are discussed infra.

A float controlled pneumatic pressure valve 150 is mounted outside the containment wall 110 on the wall top 112 at the float aperture 126. The float controlled pneumatic pressure valve 150 controls gas pressure provided from the natural gas well (not shown) and can be operated independently, or with a delay and a second valve 151 to close the gravity open swing cap valve 200. The float valve 150 includes a float arm 152 connected to the float valve at the valve end 154 that then extends through the float aperture 126 to a body end 156 that is connected to a float body 158. This configuration of mounting the float valve 150 outside of the containment wall 110 and extending the float arm 152 into the blow case 100 to the float body 158 allows for easy maintenance of the float valve 150.

The inlet pipe 160 has a discharge end 162 with a planar face 164 directly located above the outlet pipe 170 to allow for gravity clearing of debris that would interfere with the gravity open swing cap valve 200. Thus, one has a gravity debris flow away from the sealing location for natural clearing of the valve. The gravity open swing cap check valve 200 includes a valve body 202 forming part of the containment wall 110 that defines a cradle 204, a top access port 206, and includes a top cover 208 for sealing the top access port 206. The clapper type check valve 200 is located close to the top of the containment wall 100 with an access port 206 and cover 208 for above ground servicing and clearing of the clap assembly 210. The clap assembly 210 includes a hinge pin 212 that sits in and rotates in the cradle 204. The clap assembly 210 includes a gravity extension arm 214 that extends outward to move the center of gravity to allow for gravity opening of the valve 200. The gravity extension arm connects to the drop arm 216 drops down to its lower end to the clapper 218 that has a front face 220 either machined to mate with the inlet pipe or may be constructed with a seal 224 with both the front face 220 and seal 224 having a size and shape for selectively sealing the discharge end 162 for the inlet pipe 160. The use of a gravity open valve means that no pneumatic pressure has to be maintained during flow conditions, which is the majority of time the well is operated with liquid flowing into the blow case 100.

The clapper 218 has a back face 222 that received the gas pressure from the pressure nozzle end 232 to move the clapper 218 from the open position 226 to the closed position 228 to seal the inlet pipe 160.

The clap assembly 210 includes a clapper 218 that is removable and the valve body includes a flushing pipe access aperture 209 that is also directly positioned above the outlet pipe 170. The flushing pipe access aperture 209 is also sized to allow for a flushing pipe 300 to be inserted for direct access to the outlet pipe 170 for flushing of the outlet pipe 170.

The pneumatic nozzle 230 includes a nozzle end 232 connected to nozzle piping 234 that received controlled gas pressure from the float controlled pneumatic valve 150 or the second valve 151.

FIGS. 7 through 11 provide a cut away schematic view of the blow case 100 showing the left end 102 mounted pneumatic float valve 150, the second valve 151 connected to the nozzle 230 and the right end 106 clapper check valve 200. FIG. 7 shows the pneumatic float valve 150 in a low float body position and the second valve 151 turned off which shuts off the compressed gas flow to the pneumatic nozzle 230 and lets the check valve 200 assume its naturally open position with direct debris 12 flow from the inlet 128 directly to the outlet 170.

Figure 8:
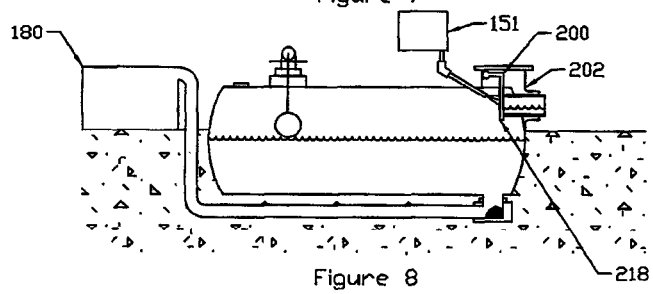
FIG. 8 is the cut away schematic view FIG. 7 with the left end pneumatic float valve in a high float body activate position activating the pressure nozzle to close the right end clapper check valve.

FIG. 8 shows the left end pneumatic float valve 150 in a high float body activate flow position activating the pressure nozzle 230 to close the right end clapper check valve 200.

Figure 9:
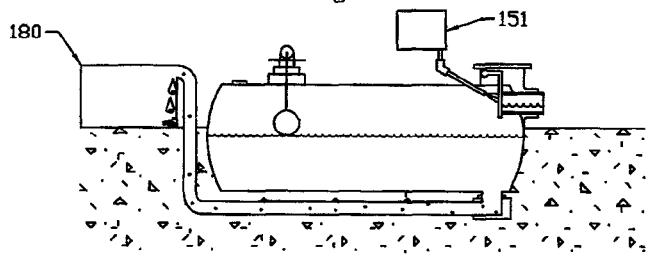
FIG. 9 is the cut away schematic view FIG. 7 with the left end pneumatic float valve in a high float body activate position activating the pressure nozzle to close the right end clapper check valve and pressurize the blow case to force liquid and debris removal through the outlet.

FIG. 9 shows the left end pneumatic float valve 150 continuing in the high float body activate position and continuing to release pressure through the pressure nozzle 230 to pressurize the blow case to force the liquid 10 and debris 12 through the outlet 170 to the waste tank 180.

Figure 10:
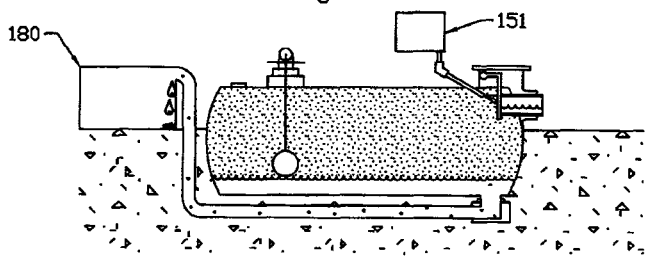
FIG. 10 is the cut away schematic view FIG. 9 with the pressure evacuating the liquid and debris from the blow case to thereby lower the left end pneumatic float valve to a low float body position.

FIG. 10 shows the off position of the float valve 150, which would shut off the flow to the nozzle 230 if no delay or second valve 151 was utilized.

Figure 11:
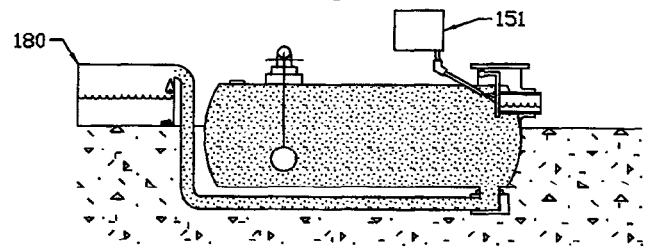
FIG. 11 is the cut away schematic view FIG. 9 with the pressure evacuating the liquid and debris from the blow case to thereby lower the left end pneumatic float valve to a low float body position and the continued clearing is a timer is used to completely clear the blow case.

FIG. 11 shows using the pressure to completely evacuate the liquid 10 and debris 12 from the blow case 100 using a delayed bleed and second valve 151 to control the pressure bleed off after the pneumatic valve 150 has already shut off. The continued operation of the second valve 151 allows for continued pressure evacuation of the liquid 10 and debris 12 from the blow case to thereby lower liquid 10 level below the left end pneumatic float valve 150 an its low float body position before shutting off pressurized pneumatic or pneumatic flow to the nozzle 230.

Reference numerals used throughout the detailed description and the drawings correspond to the following elements:
liquid flow 10
debris 12
ground level 20
blow case 100
first end 102
middle section 104
second end 106
containment wall 110
wall top 112
wall bottom 114
wall side 116
inside surface 118
outside surface 120
interior compartment 122
pressure relief aperture 124
float aperture 126
inlet aperture 128
outlet aperture 130
float controlled pneumatic pilot valve or pneumatic pressure valve 150
float arm 152
arm valve end 154
arm body end 156
float body 158
inlet pipe 160
discharge end 162
planar face 164
outlet pipe 170
waste tank 180
gravity open swing cap valve 200
valve body 202 forming part of the containment wall
cradle 204
top access port 206
cover 208
pipe access aperture 209
clap assembly 210
hinge pin 212
gravity extension arm 214
drop arm 216
clapper 218
front face 220
back face 222
seal 224
open position 226
closed position 228
pneumatic nozzle 230
nozzle end 232
nozzle piping 234
flushing pipe 300

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A blow case apparatus for use with a liquid flow including debris, the blow case apparatus mounted at least partially above ground level, the blow case apparatus comprising:

a containment wall defining an outside and an interior compartment, the containment wall defining an inlet aperture and an outlet aperture;

an inlet pipe mounted in the inlet aperture, the inlet pipe including a discharge end and a gravity open swing cap valve mounted at the discharge end;

the discharge end and the outlet aperture coordinately positioned such that a gravity debris settlement area is located gravitationally below the discharge end and the discharge end is vertically positioned directly above the outlet aperture, and the outlet aperture is positioned within the gravity direct debris settlement area;

the containment wall defining a top access port directly above the outlet aperture;

the containment wall defining a float aperture and a distal end from the inlet aperture; and a float valve including a valve body mounted outside the containment wall at the float aperture, the float valve including a float arm extending through the float aperture and a float body connected to the float arm.

* * * * *